United States Patent
Poorman et al.

(10) Patent No.: US 8,737,007 B2
(45) Date of Patent: May 27, 2014

(54) REDUCTION OF DEGRADATION OF MAGNETIC TAPE APPARATUS

(75) Inventors: Paul Poorman, Meridian, ID (US); Geoff Spratt, Meridian, ID (US); Mike Holmberg, Eagle, ID (US); Lawrence A Hansen, Meridian, ID (US); Brian Brong, Eagle, ID (US); Richard Dee, Boulder, CO (US)

(73) Assignees: Hewlett-Packard Development Company, L.P., Houston, TX (US); Quantum Corporation, San Jose, CA (US)

( * ) Notice: Subject to any disclaimer, the term of this patent is extended or adjusted under 35 U.S.C. 154(b) by 161 days.

(21) Appl. No.: 13/432,130

(22) Filed: Mar. 28, 2012

(65) Prior Publication Data

US 2013/0258517 A1    Oct. 3, 2013

(51) Int. Cl.
*G11B 15/18* (2006.01)
(52) U.S. Cl.
USPC .......... 360/69; 360/66; 360/128; 360/130.21; 360/97.12
(58) Field of Classification Search
USPC .............. 360/69, 128, 137, 90, 110, 121, 66, 360/323, 317, 55, 75, 134, 77.15, 83, 291, 360/130.21, 97.12
See application file for complete search history.

(56) References Cited

U.S. PATENT DOCUMENTS

| 5,296,975 | A   |   | 3/1994  | Contreras et al. |        |
|-----------|-----|---|---------|------------------|--------|
| 6,038,106 | A   |   | 3/2000  | Aboaf et al.     |        |
| 7,486,475 | B2  |   | 2/2009  | Biskeborn        |        |
| 7,551,385 | B2  | * | 6/2009  | Biskeborn et al. | 360/69 |
| 7,656,602 | B2  |   | 2/2010  | Iben et al.      |        |
| 7,715,141 | B2  | * | 5/2010  | Biskeborn        | 360/66 |
| 8,553,353 | B2  | * | 10/2013 | Ellis et al.     | 360/90 |
| 2010/0273026 | A1 |  | 10/2010 | Riemer et al.    |        |
| 2013/0148238 | A1 | * | 6/2013 | Ellis et al.     | 360/90 |

* cited by examiner

*Primary Examiner* — Ali Neyzari

(57) ABSTRACT

Methods and apparatus are provided related to magnetic recording tape. Respective voltage sources are coupled to respective magnetic head components of a tape recording apparatus. Circuitry controls each voltage source independently in accordance with identity information for a magnetic tape, relative humidity within the tape recording apparatus, or other factors. Chemical migration from the tape, and/or plating or erosion of elements of the tape recording apparatus are substantially reduced or eliminated according to the present teachings.

16 Claims, 3 Drawing Sheets

REDUCTION OF DEGRADATION OF MAGNETIC TAPE APPARATUS

BACKGROUND

Magnetic recording tape has been used for many years for storage and retrieval of analog and digital information. Information is stored on such a tape by magnetizing regions of the tape using a write or recording head so as to encode 0's and 1's where the magnetized regions change polarity. Such information can also be retrieved from the tape by way of a read or playback head.

However, drawing the tape from a first reel, passing it over a write or read head (or combination of the two) and gathering it on second reel can result in static electric charge on the surface of the tape. The molecules of chemical constituents of the tape can also be broken into smaller charged snippets by contact of the tape with the sharp air-skiving edge of a recording head which can then erode metals in the recording head, or combine with electrons from an electron source to plate material onto the surface of the head. The net result is an increase in the spacing between head and tape which degrades the ability of the head to write and read to and from the tape. The present teachings address these and related concerns.

BRIEF DESCRIPTION OF THE DRAWINGS

The present embodiments will now be described, by way of example, with reference to the accompanying drawings, in which.

DETAILED DESCRIPTION

Introduction

Apparatus and methods are provided related to magnetic recording tape. Respective voltage sources are coupled to constituent components of a magnetic head of a tape recording apparatus. Circuitry controls each voltage source independently in accordance with identity information for a magnetic tape, relative humidity within the tape recording apparatus, or other factors. Chemical migration from the tape, erosion of elements of the tape recording apparatus, or other problems are substantially reduced or eliminated according to the present teachings.

In one example, a magnetic tape recording apparatus includes a plurality of voltage sources, each of which is electrically coupled to one or more magnetic head constituent components. The voltage sources are individually operable so as to reduce at least chemical migration from, or erosion caused by, a magnetic recording tape.

In another example, a method includes controlling a plurality of voltage sources that are electrically coupled to a plurality of magnetic head constituent components. The voltage sources are independently operable so as to reduce at least chemical migration from, or erosion caused by, a magnetic recording tape.

Illustrative Tape Recording Apparatus

Figure 1:
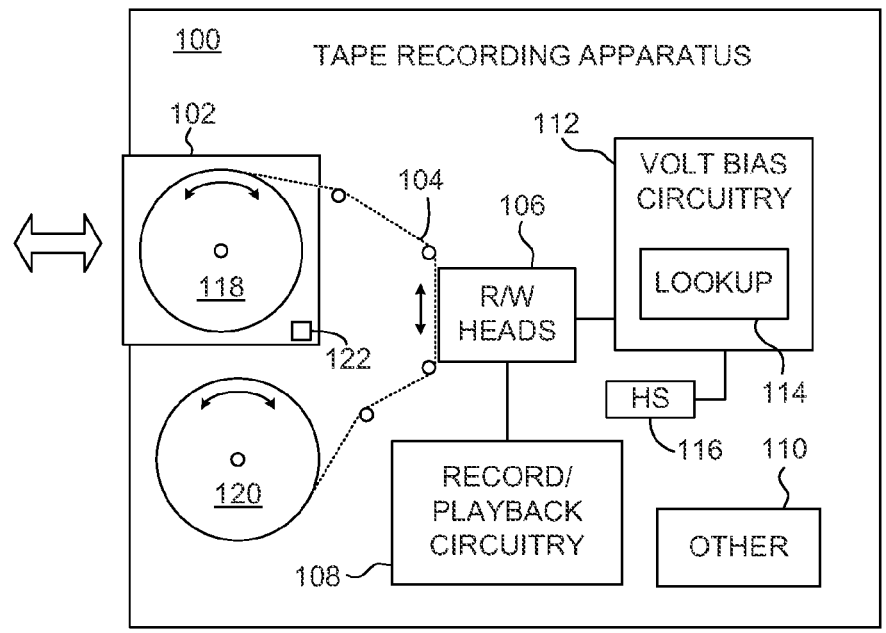
FIG. 1 depicts a block diagrammatic view of a tape recording apparatus according to the present teachings.

Reference is now directed to FIG. 1, which depicts a block diagrammatic view of a tape recording apparatus (apparatus) 100. The apparatus 100 is illustrative and non-limiting with respect to the present teachings. Thus, other tape recording apparatus, devices and systems can be configured, formed or used in accordance with the present teachings.

The apparatus 100 is configured to removably receive a tape cartridge 102. The tape cartridge 102 includes a quantity (or length) of magnetic recording tape (tape) 104. The tape 104 is bidirectionally transportable between a reel 118 of the tape cartridge 102 and a reel 120 of the apparatus 100. Such transport is performed by way of conventional mechanisms of the apparatus 100.

The tape 104 bears recordable magnetic constituency on a surface or surfaces, and is characterized by a generation and a manufacturer. The tape 104 can be defined by other characteristics as well that are not germane to the present teachings. The present teachings also contemplate operations in the context of open or reel-to-reel tape recording systems, as well.

The apparatus 100 includes a read-and-write head assembly (heads) 106. The tape 104 is transported past the heads 106 in contacting or very-near adjacency during normal read or write (i.e., playback or recording) operations. The apparatus 100 also includes record/playback circuitry 108 that is configured to retrieve information from and record information to the tape 104 by way of electro-magnetic signaling. The record/playback circuitry 108 can be variously defined and can include any suitable analog, digital or hybrid componentry. One having ordinary skill in the magnetic recording or related arts is familiar with tape recording and playback circuitry, and further elaboration is not required for an understanding of the present teachings.

The apparatus 100 further includes other resources 110. Such other resources 110 can include, without limitation, a power supply, a user interface, an electronic display, computer or network communications circuitry, wireless resources, and so on. Other suitable elements or subsystems can also be included within the other resources 110.

The tape recording apparatus 100 also includes voltage bias circuitry (circuitry) 112 in accordance with the present teachings. The circuitry 112 is configured to determine (or sense) one or more characteristics of the tape 104 such as, without limitation, generation, manufacture, type identity, and so on, by way of information regarding the tape 104.

The circuitry 112 also includes a lookup table 114 stored on an electronically-accessible storage media. The lookup table 114 includes bias voltage values correlated to characteristics of various different tapes 104, or other variables such as relative humidity, age or usage of heads 106, age or usage of the tape 104 or cartridge 102. The lookup table 114 can include other data correlated to various other parameters, as well. The circuitry 112 is configured to locate or cross-reference data within the lookup table 114 in accordance with identity information encoded on the tape 104 or within a memory device 122 supported by the tape cartridge 102. Non-limiting examples of such memory devices 122 are a radio frequency identification device (RFID) or a memory-chip in cartridge (MIC). Other suitable memory devices 122 can also be used.

The circuitry 112 also includes a humidity sensor 116. The humidity sensor 116 is configured to sense relative humidity within a housing of the apparatus 100 and to provide a corresponding signal to the remainder of the circuitry 112. In turn, the circuitry 112 is configured to cross-reference data within the lookup table 114 in accordance with signaling from the humidity sensor 116.

The circuitry 112 includes one or more controllable voltage sources that are coupled to respective aspects of the read-and-write head assembly 106. In particular, the circuitry 112 controls the voltage sources individually according to data retrieved from the lookup table 114, such that chemical migration from the tape 104 to the heads 106 is significantly reduced or eliminated. Such reduction or elimination in chemical migration also reduces or eliminates erosive damage to the heads 106. Further elaboration on these aspects of the present teachings is provided below.

The circuitry 112 can include or be defined by any suitable constituency such as, without limitation, analog or digital or hybrid circuitry, a state-machine, application-specific integrated circuitry (ASIC), a processor configured to operate by way of a machine-readable program code, and so on. Other elements or components can also be used.

Illustrative Voltage Biasing Circuitry

Figure 2:
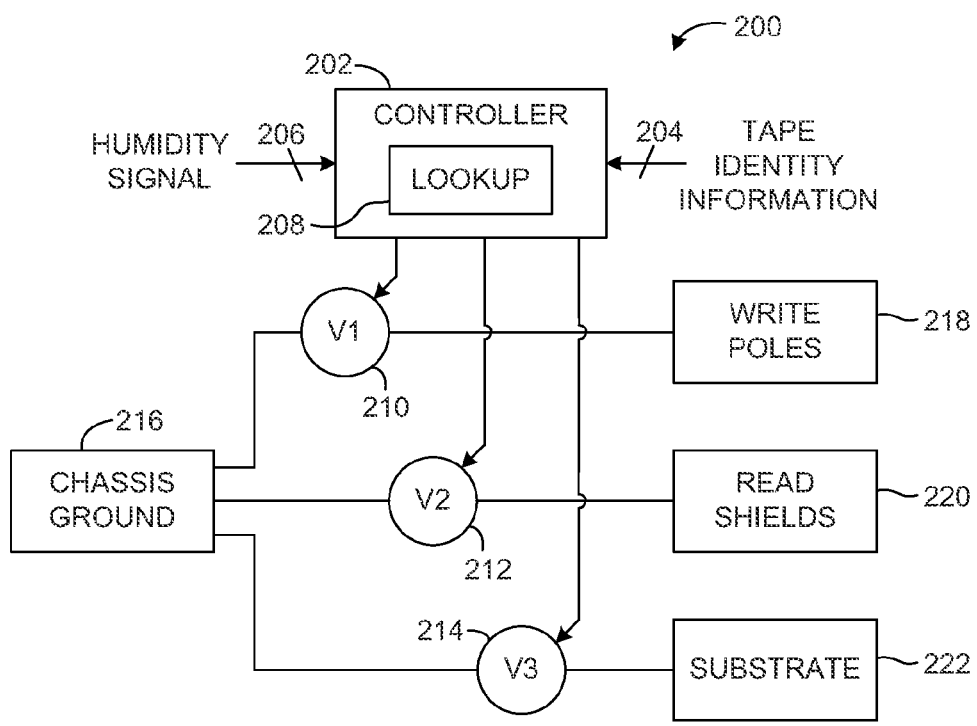
FIG. 2 depicts a block diagrammatic view of a voltage biasing circuit according to the present teachings.

Reference is now directed to FIG. 2, which depicts a block diagrammatic view of a voltage biasing circuit (circuit) 200. The circuit 200 is illustrative and non-limiting with respect to the present teachings. Thus, other circuits, devices and systems can be configured, formed or used in accordance with the present teachings. In one example, the voltage biasing circuitry 112 includes or is analogous to the circuit 200.

The circuit 200 includes a controller 202. The controller 202 is configured to receive tape identity information 204 corresponding to a magnetic recording tape (e.g., 104) and relative humidity signaling 206 from a corresponding sensor (e.g., 116). The controller 202 is also configured to retrieve data correlated to the tape identity information 204 and/or humidity signaling 206 from a lookup table 208. Such data includes, without limitation, respective bias voltages to be applied as described below. The controller 202 is further configured to independently control a plurality of voltage sources 210, 212 and 214, respectively, in accordance with data retrieved from a lookup table 208.

The circuit 200 also includes the voltage sources 210, 212 and 214 as introduced above. Each voltage source 210-214 is configured to provide a direct-current (DC) potential that is adjustable over a range according to signaling received from the controller 202. In one non-limiting example, each voltage source is variable over a range from about zero volts to about five volts DC. Other suitable control ranges can also be used. Each of the voltage sources 210-214 is coupled to a chassis ground node 216.

The voltage source 210 is also electrically coupled to one or more write poles 218. The write poles 218 define, at least in part, a write or recording head of a magnetic tape recording apparatus (e.g., 100). Thus, the voltage source 210 provides (or applies) a DC bias voltage to the write poles 218, relative to the chassis ground node 216, under the controlling influence of the controller 202. The voltage source 210 operates to eliminate or reduce chemical migration from or erosive damage caused by magnetic recording tape.

In turn, the voltage source 212 is electrically coupled to one or more read shields 220. Such read shields 220 are elements of a read or playback head of the recording apparatus of the present example. The voltage source 212 therefore provides a DC bias voltage to the read shields 220 in accordance with control signaling from the controller 202. The voltage source 212 operates to eliminate the source of electrons that could combine to create stain at the pole or shield tips or to condition the sensitive metals of the poles and shields so as to be either passivating or inert.

Furthermore, the voltage source 214 is electrically coupled to a substrate 222. The substrate 222 is understood to support, among other things, the write poles 218 and read shields 220, respectively. The substrate 222 is therefore in close proximity to the write poles 218 and the read shields 220, and is potentially adversely affected by chemical migration or stain buildup (plating) in essentially the same manner. Accordingly, the voltage source 214 provides a DC bias voltage to the substrate 222 in accordance with control signaling from the controller 202, directed toward tape-related problem reduction or elimination.

Operation of the circuit 200 is generally as follows: The controller 202 receives information 204 indicating a generation and a manufacturer for a particular magnetic recording tape. The controller 202 also receives humidity signaling 206 corresponding to the relative humidity within a tape recording apparatus enclosure or housing.

The controller 202 accesses the lookup table 208 and locates data therein correlated to the generation, manufacture and humidity information/signaling received above. The controller 202 then controls the voltage sources 210, 212 and 214, independently, in accordance with the bias voltage values within the accessed data. In one non-limiting example, the voltage sources 210, 212 and 214 are controlled to 1.5, 2.0 and 1.75 volts DC, respectively. Any number of other respective voltage combinations can also be used. Chemical migration to and/or erosion of the respective elements 218-222 is eliminated or reduced by way of the bias voltage control according to the present teachings.

Illustrative Head System

Figure 3A:
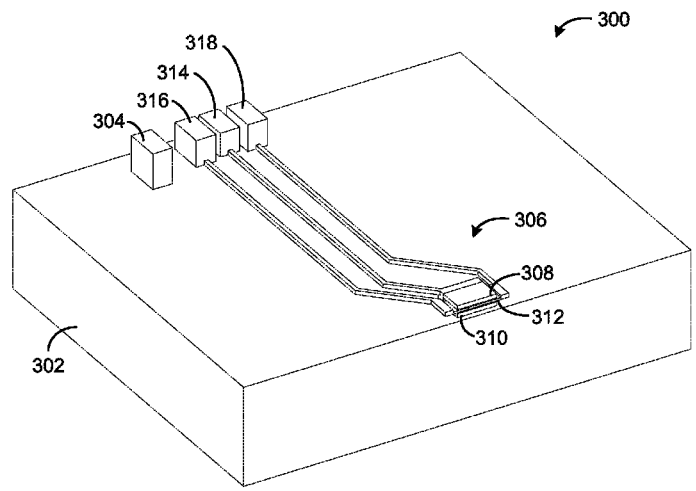
FIG. 3A is an isometric-like view of a playback head contemplated by the present teachings.
Figure 3B:
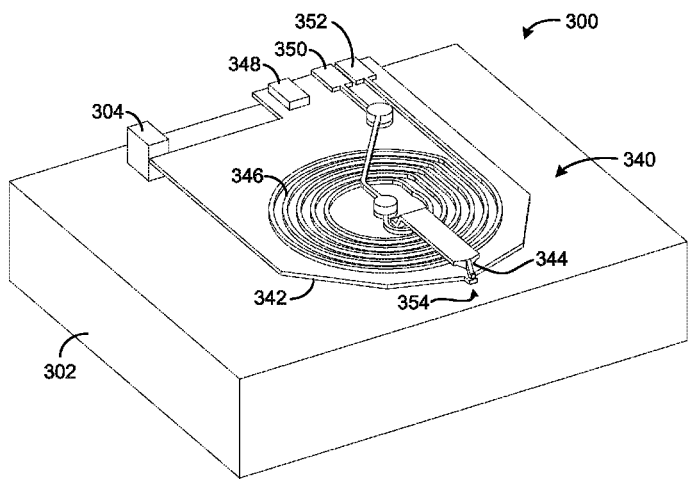
FIG. 3B is an isometric-like view of a recording head contemplated by the present teachings.
Figure 3C:
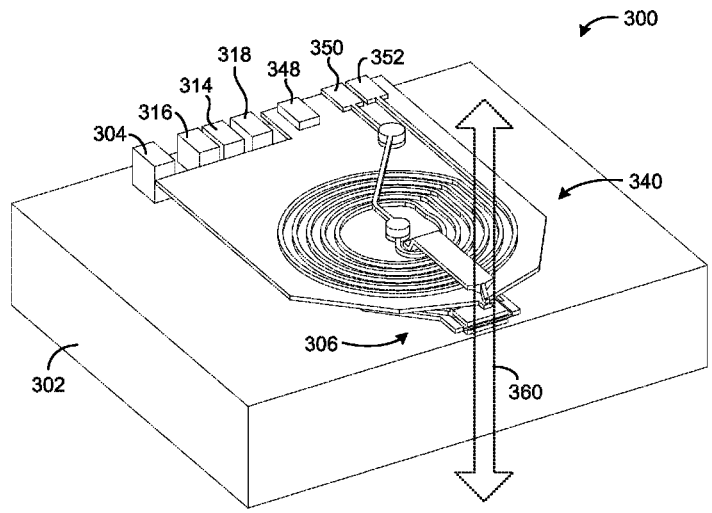
FIG. 3C is an isometric-like view combining the elements of FIGS. 3A and 3B.

Reference is now made to FIGS. 3A-3C, which respectively depict isometric-like views of aspects of a recording/playback head system (system) 300. In particular, FIG. 3A depicts a playback (or read) head system, FIG. 3B depicts a recording (or write) head system, and FIG. 3C depicts the playback and record head systems combined. The system 300 is illustrative and non-limiting in nature. Other systems having other respective characteristics or operating in accordance with other scenarios can also be used.

With reference to FIG. 3A, the system 300 includes a substrate 302 configured to support other aspects of the system 300 as described below. The substrate 302 can be formed from a hard polished material including but not limited to Aluminum Oxide Titanium Carbide (AlTiC), Silicon Carbide, Silicon, sapphire (aluminum oxide) or any other suitable material. The substrate 302 includes a connection feature or node 304 configured to be coupled to a source of bias voltage (e.g., 214) in accordance with the present teachings.

The system 300 also includes a playback head 306 defined by or including respective read shields 308 and 310, and a read stripe 312. The read shields 308 and 310 are electrically coupled to a node 314 configured to be coupled to a source of bias voltage (e.g., 212) in accordance with the present teachings. In turn, the read stripe 312 is electrically coupled to respective nodes 316 and 318. The various elements 308-318 of the playback head 306 are supported by way of the substrate 302.

Turning attention now to FIG. 3B, the system 300 also includes a recording head 340, which includes a bottom write pole 342, a top write pole 344 and a write coil 346. The top and bottom write poles 342 and 344 are electrically coupled to a node 348 that is configured to be coupled to a source of bias voltage (e.g., 210) in accordance with the present teachings. Opposite ends of the write coil 346 are electrically coupled to nodes 350 and 352, respectively. The write coil 346 is insulated or electrically isolated from the both the bottom write pole 342 and the top write pole 344. The respective elements 342-352 of the recording head 340 are supported by way of the substrate 302. The top and bottom write poles 342 and 344 are formed and disposed in near spaced adjacency such that a write gap 354 is defined.

Making reference now to FIG. 30, the system 300 is depicted in its entirety. The playback head 306 and the recording head 340 are arranged in a stacked relationship and are in near adjacency to each other. In turn, the substrate 302 underlies and supports the playback head 306 and the recording head 340 and their respective elements.

During normal operation, a magnetic recording tape (e.g., 104) is bidirectionally transported in very near or contacting adjacency past the playback head 306 and the recording head 340 as depicted by the arrow 360. Electrical signals corresponding to information read from the tape are provided to the respective nodes 316 and 318. Conversely, information can be written to the tape by way of electrical signals provided to the respective nodes 350 and 352. Such read and/or write signals can be received or provided, respectively, by record/playback circuitry (e.g., 108).

Additionally, respective bias voltages are provided to the nodes 304, 314 and 348 in accordance with, for non-limiting example, generation or manufacturer information for the particular tape being used, relative humidity ambient to the respective heads 306 and 340, and so on. The three respective bias voltages can be provided, for example, by way of circuitry equivalent or analogous to the voltage biasing circuit 200 described above. Other circuits in accordance with the present teachings can also be used. Such bias voltages function to reduce or eliminate chemical migration from or erosion of the recording head 340, the playback head 306 and/or the substrate 302 caused by the passing tape (e.g., 104).

Illustrative Method

Figure 4:
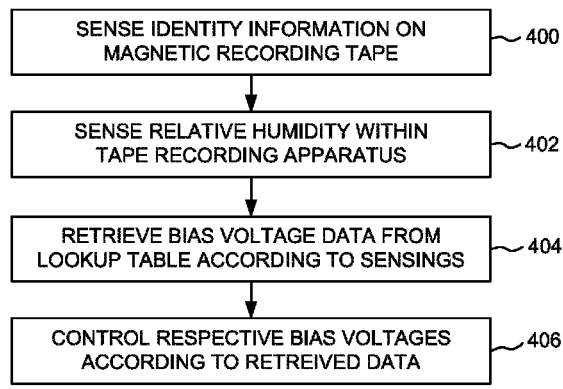
FIG. 4 is a flow diagram of a method according to the present teachings.

Reference is made now to FIG. 4, which depicts a flow diagram of a method according to the present teachings. The method of FIG. 4 includes particular operations and order of execution. However, other methods including other operations, omitting one or more of the depicted operations, and/or proceeding in other orders of execution can also be used according to the present teachings. Thus, the method of FIG. 4 is illustrative and non-limiting in nature. Reference is also made to FIGS. 1 and 2 in the interest of understanding the method of FIG. 4.

At 400, identity information encoded on a magnetic recording tape is sensed. Alternatively, identity information can be read from an RFID or MIC (memory-chip in cartridge) associated with the recording tape. For purposes of a present example, a magnetic recording tape 104 of a tape cartridge 102 is transported past a read-and-write head assembly 106. Information including generation and manufacturer is read from the tape 104 and corresponding signals 204 are provided to a controller 202. In the alternative, such information is read from a memory device 122 of the tape cartridge 102.

At 402, relative humidity within a tape recording apparatus is sensed. For purposes of the present example, a humidity sensor 116 senses relative humidity within a tape recording apparatus 100 and corresponding signaling 206 is provided to the controller 202.

At 404, bias voltage data is retrieved from a lookup table according to the respective signaling and sensing. In the present example, the controller 202 accesses a lookup table 114 thereof and finds (i.e., locates, or cross-references) data that is correlated to the tape identity signaling 204 and the humidity signaling 206. In this example, three respective bias voltages are located or determined.

At 406, respective bias voltages are controlled according to the retrieved data. For purposes of the present example, the controller 202 individually controls voltage sources 210, 212 and 214, respectively, in accordance with the data retrieved from the lookup table 114. Write poles 218, read shields 220 and a substrate 222 of the write-and-read head assembly 106 are subjected to reduced or eliminated chemical migration or erosive damage caused by the tape 104.

In general, and without limitation, the present teachings contemplate various apparatus, systems, devices and methods for reducing or eliminating damage or performance reduction resulting from chemical migration from, or erosion caused by, a magnetic recording tape to various elements of a read-and-write head assembly. Typically, tape is drawn from a supply reel and transported or routed in passing contact or near proximity with read and write heads during normal information recording or playback.

Drawing the tape from a reel results in a static electric charge on the surface of the tape by virtue of tribo-electric phenomena. The molecules of chemical constituents of the tape, such as lubricants, binders, and dispersants can also be broken into smaller charged snippets by contact of the tape with the sharp air-skiving edge of a recording head which can then erode metals in the recording head, or combine with electrons from an electron source to plate material onto the surface of the head. Whether by depletion of poles or shields, or by buildup of material on the surface of the head, the net result is the same: an increase in the spacing between head and tape which degrades the ability of the head to write and read to and from the tape.

The charged molecular fragments born by the tape can be prevented from becoming a surface stain by using a bias voltage to eliminate a source of electrons. The source of bias voltage also operates to place the sensitive metals of the poles and shields into a region of their respective Pourbaix diagram that is either passivating or inert. Bias voltages can be respectively varied in accordance with any number of parameters such as, without limitation, relative humidity, tape direction of travel, age or use of a read-and-write head assembly, age or use of a tape cartridge, and so on.

In general, the foregoing description is intended to be illustrative and not restrictive. Many embodiments and applications other than the examples provided would be apparent to those of ordinary skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. A magnetic tape recording apparatus, comprising:
   a plurality of voltage sources electrically coupled to a plurality of magnetic head constituent components, the voltage sources operable so as to reduce at least chemical migration from a magnetic recording tape or plating or erosion caused by a magnetic recording tape; and
   a controller configured to independently control the respective voltage sources in accordance with information stored within a lookup table.

2. The magnetic tape recording apparatus according to claim 1, the one or more parameters including at least a relative humidity within the magnetic tape recording apparatus, a direction of travel of the magnetic recording tape, an age or use of a magnetic head, or an age or use of a tape cartridge.

3. The magnetic tape recording apparatus according to claim 1, the controller further configured to determine at least a generation or a manufacturer for the magnetic recording tape by way of the lookup table.

4. The magnetic tape recording apparatus according to claim 1 further comprising a sensor configured to sense information related to a media type encoded on at least the magnetic recording tape or a memory device associated with the magnetic recording tape, the controller further configured to determine at least the generation or the manufacturer by way of signaling from the sensor.

5. The magnetic tape recording apparatus according to claim 1, configured to operate by way of a removable cartridge including the magnetic recording tape.

6. The magnetic tape recording apparatus according to claim 1, the respective voltage sources electrically coupled to a chassis ground.

7. The magnetic tape recording apparatus according to claim 1, each of the voltage sources configured to provide a voltage output that is independent of that of the other voltage sources.

8. A method, comprising:
controlling a plurality of voltage sources electrically coupled to a plurality of magnetic head constituent components, the voltage sources operable so as to reduce at least chemical migration from or erosion caused by a magnetic recording tape;
sensing identifying information encoded on at least one of the magnetic recording tape or a memory device of a cartridge of the magnetic recording tape;
determining at least a generation or a manufacturer for the magnetic recording tape by way of the identifying information; and
controlling the respective voltage sources in accordance with data correlated to at least the generation or the manufacturer.

9. The method according to claim 8, the controlling the plurality of voltage sources such that at least two different voltages are provided to respective ones of the magnetic head constituent components.

10. The method according to claim 8 further comprising controlling the respective voltage sources in accordance with one or more parameters including at least a relative humidity within a tape recording apparatus, a direction of travel of the magnetic recording tape, an age or use of a magnetic head, or an age or use of a tape cartridge.

11. The method according to claim 8 flintier comprising reading the data from an electronically accessible storage media.

12. The method according to claim 8, the magnetic recording tape provided by way of a removable cartridge.

13. A magnetic tape recording apparatus, comprising:
a plurality of voltage sources electrically coupled to a plurality of magnetic head constituent components, the voltage sources operable so as to reduce at least chemical migration from a magnetic recording tape or plating or erosion caused by a magnetic recording tape; and
a controller further configured to determine at least a generation or a manufacturer for the magnetic recording tape.

14. The magnetic tape recording apparatus of claim 13, wherein the controller is further configured to determine at least the generation or the manufacturer for the magnetic recording tape by way of the lookup table.

15. The magnetic tape recording apparatus of claim 13, further comprising a sensor configured to sense information related to a media type encoded on at least the magnetic recording tape or a memory device associated with the magnetic recording tape.

16. The magnetic tape recording apparatus of claim 15, wherein the controller is further configured to determine at least the generation or the manufacturer by way of signaling from the sensor.

* * * * *

UNITED STATES PATENT AND TRADEMARK OFFICE
CERTIFICATE OF CORRECTION

PATENT NO.         : 8,737,007 B2
APPLICATION NO.    : 13/432130
DATED              : May 27, 2014
INVENTOR(S)        : Paul Poorman et al.

Page 1 of 1

It is certified that error appears in the above-identified patent and that said Letters Patent is hereby corrected as shown below:

In the Claims:

In column 8, line 11, in Claim 11, delete "flintier" and insert -- further --, therefor.

Signed and Sealed this
Ninth Day of September, 2014

Michelle K. Lee
*Deputy Director of the United States Patent and Trademark Office*